Sept. 20, 1966 W. J. DAVIS 3,274,328
DIELECTRIC FOR CIRCUIT BOARD AND STRIP LINES
Filed June 6, 1963
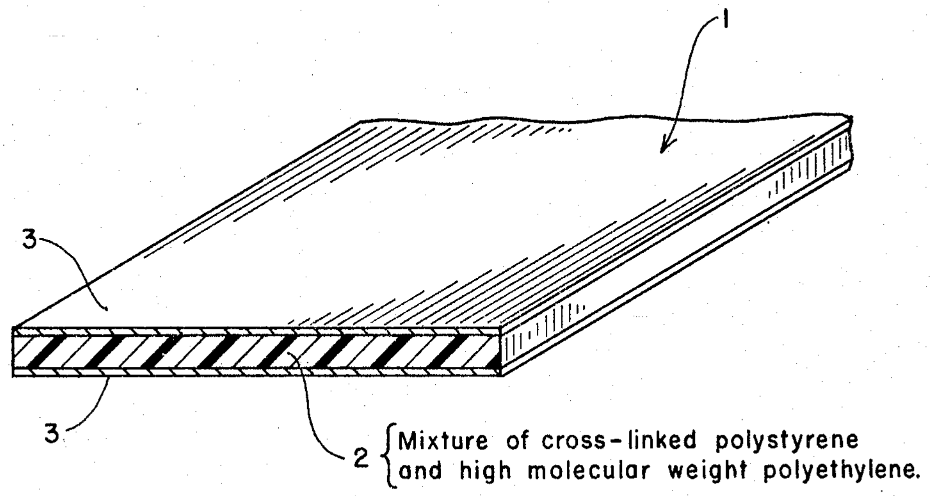
INVENTOR
WILLIAM J. DAVIS
BY Richard O. Church
ATTORNEY United States Patent Office 3,274,328

Patented Sept. 20, 1966

3,274,328

DIELECTRIC FOR CIRCUIT BOARD AND STRIP LINES

William J. Davis, Wyomissing, Pa., assignor, by mesne assignments, to The Polymer Corporation, a corporation of Pennsylvania Filed June 6, 1963, Ser. No. 286,126
6 Claims. (Cl. 174—68.5)

This invention relates to low loss dielectric materials. More particularly, this invention relates to improved low loss dielectric materials, methods for their preparation, and means for fabricating and using them as circuit boards, strip transmission lines, insulating components, and the like, where high frequencies are encountered.

Until comparatively recent times, dielectric materials were selected primarily for their insulating characteristics. With the increased utilization of higher and higher frequencies and miniaturized circuits often carrying high power inputs, the dielectric loss of circuit materials has also become an important criterion in their selection. For example, the use of compact circuits, as are achieved with circuit boards, and the use of strip transmission lines for extremely high frequency wave guides, often at high power, dictate the selection of materials having low loss dielectrics.

As the implied frequencies increase, the loss of energy in the dielectric also normally increases. It is possible that the available energy may virtually all be consumed in the dielectric itself. This phenomenon has long been recognized and has usefully been applied as, for example, in the process of dielectric heating. However, in high frequency circuitry applications, dielectric losses can become intolerable.

Firstly, high losses in a circuit may cause an erroneous function or even complete failure of the circuit.

Secondly, accumulated losses in large systems may be so great as to require improbably large or costly power supply systems. The power or energy input may be increased, within limits, to overcome losses, but a point can be reached where the materials at the input side can no longer carry the high energy necessary to achieve the required energy output at the other end of the system without failure. Not only may be materials fail electrically, but, as dielectric losses are dissipated as heat, the dielectric material may fail mechanically as by softening and melting.

In selecting low loss dielectric materials for use with high frequencies, certain physical and chemical properties should also be considered. The following properties may be mentioned as representative of said of the more important ones.

(1) *Dielectric constant.*—A low dielectric constant is generally desirable and, further, selective control over the dielectric constant may be advantageous in order to match the design requirements of a given circuit.

(2) *Electrical conductivity.*—The electrical properties of the dielectric are, of course, of importance and the material should have high dielectric strength and high surface and volume resistivity.

(3) *Mechanical strength.*—A high flexural modulus may be required to provide rigidity and mechanical strength to the component.

(4) *Thermal resistance.*—A high melting point and/or a high heat distortion temperature is desired. Due to the heat accumulation and temperature build-up in high frequency applications, it is necessary that the dielectric material be capable of operation and have form stability at the imposed temperatures. Further, in the fabrication of such items as circuit boards, it is of considerable convenience to provide a dielectric material that can withstand dip soldering procedures. This may require that the dielectric material be unaffected by exposure to temperatures of about 450° F. for periods as long as 60 seconds.

(5) *Adhesion to metallic conductors.*—Dielectric materials used in the preparation of circuit boards and transmission lines must be provided with conductive surface areas. One of the newer technologies for obtaining such conductive surface utilizes methods for bonding copper sheet or foil to the dielectric material. If these methods are to be used, it is necessary to be able to obtain good adhesion between the dielectric and the copper foil.

(6) *Machinability.*—The dielectric material should be machinable and operations such as punching and stamping should not physically damage the dielectric material as by cracking, tearing, etc.

(7) *Flexibility.*—The dielectric material preferably should be somewhat flexible and not brittle so that thin sections can be folded and inserted into various components without cracking.

(8) *Chemical and solvent resistance.*—Due to solutions generally used in circuitry, such as for cleaning and degreasing, it is often important that the dielectric materials not be attacked by common solvents and chemicals. While other properties for an idealized high frequency dielectric material may be mentioned, it is believed that the above are most representative.

Accordingly, it is an object of this invention to prepare dielectric materials that have a low dielectric loss.

Another object of this invention is to provide low loss dielectric materials that have useful mechanical and chemical properties.

A further object of this invention is to provide dielectric materials especially suited for use in fabricating circuit boards, strip transmission lines, insulating components and the like.

And yet another object of this invention is to provide circuit boards, strip transmission lines, insulating components and the like, having low dielectric losses at high imposed frequencies.

Briefly, these and other objects are obtained by utilizing materials comprised of both polyethylene and polystyrene for the aforesaid circuit components. By these means the good dielectric properties of both materials are preserved while the better physical properties of each modifies the poorer properties of the other thus resulting in a dielectric material approaching the idealized properties referred to above.

The figure is a perspective view, partially in section, of a portion of a circuit board constructed in accordance with this invention in which the circuit board is generally illustrated as at 1. The circuit board 1 is comprised of a generally flat sheet of a dielectric material 2 onto the surfaces of which have been adhered thin sheets of copper foil 3. The dielectric material 2 itself is comprised of an intimate blend of cross linked polystyrene and a high molecular weight polyethylene that is free from antioxidants.

In the practice of this invention the polyethylene and polystyrene are mixed together in powdered form and then hot pressed into a composite sheet or plate. By varying the proportions of polyethylene and polystyrene, the properties, that is, electrical, chemical and physical, can be adjusted within certain limits. Quite generally physical strength and resistance to heat are provided by the polystyrene while toughness, flexibility and machinability, as well as bondability to copper, are provided by the polyethylene.

In selecting suitable raw materials, either straight chained or cross-linked electrical grade (low loss) polystyrene can be used. Cross-linked polystyrene is preferred due to its greater strength.

High molecular weight (above about one and one-half million) polyethylene is the most desirable grade of polyethylene to use since it is relatively resistant to oxidation. This in turn means that antioxidants, which generally have high dielectric losses, need not be included in the formulation.

When desired, for greater rigidity, the composite sheet may be subjected to irradiation. It is believed this serves to cross link the polyethylene to itself and possibly to the polystyrene.

*Example*

Cross-linked polystyrene prepared with divinylbenzene as the cross-linking agent was ground to about 200 mesh and dry blended with minus 80 mesh high molecular weight polyethylene which contained no antioxidants (trade named AC 1220 by Allied Chemical Company). The proportions were 25% by weight polystyrene and 75% by weight polyethylene. The intimate mixture was placed in a 3/16″ deep, 6″ square heated mold and pressed in the following sequence: 400° F. at no pressure for 2 minutes, 400° F. at 70 p.s.i. for 1 minute, and 400° F. at 400 p.s.i. for 3 minutes. The pressure of 400 p.s.i. was maintained while the mold was cooled to room temperature by water cooling in about 3 minutes. The composite plate was then annealed for 8 hours under a nitrogen blanket in order to relieve stresses and provide for dimensional stability.

The surfaces of the composite plate were roughened with course (40 grid) emery in preparation for bonding copper foil on either side. The copper was about 3 mils thick and was bonded using techniques as described in Chemical and Engineering News of December 24, 1962 as follows: The copper foil was farefully cleaned in concentrated nitric acid and one surface was then oxidized to the black cupric oxide. The copper foil was cut to similar dimensions as the composite plate and the oxidized surfaces of the copper foil were placted in contact with both surfaces of the plate. This "sandwich" was placed in a mold heated to 500° F. under an initial pressure of 400 p.s.i. The pressure decreased as the polyethylene melted and flowed out but the lost pressure was not restored. After 10 minutes, cooling water was bled into the platen cooling system and in about 5 minutes the sample could be released and handled.

The copper clad circuit board so produced was in all respects satisfactory for use in high frequency circuit boards. Some of its properties were as follows:

| | |
|---|---|
| Dielectric constant | 2.42. |
| Loss tangent | 0.00001. |
| Dielectric strength | 450 volts/mil. |
| Volume resistivity | $10^{15}$ ohm cm. |
| Surface resistivity | $10^{13}$ ohm cm.$^2$. |
| Specific gravity | 1.00 gm./cc. |
| Hardness | 70 Durometer D. |
| Tensile strength | 3,800 p.s.i. |
| Elongation | 75%. |
| Elastic modulus | 170,000 p.s.i. |
| Coefficient of thermal expansion | $6.5 \times 10^{-5}$ in./in./° F. |
| Peal strength of copper foil | 25 to 50 lbs./in width. |
| Solder dip resistance | 45 sec. at 450° F. |
| Chemical resistance | Excellent. |
| Solvent resistance | Good. |
| Radiation resistance | Excellent. |
| Water absorption | Nil. |

I claim:

1. A circuit board, strip transmission line or the like adapted for high frequencies use comprising a low loss dielectric member and a conductive coating on at least one side of said member, said member consisting essentially of an intimate mixture of cross linked polystyrene and high molecular weight, antioxidant free polyethylene and said conductive coating being comprised of copper.

2. A low loss dielectric material consisting essentially of an intimate mixture of cross linked polystyrene and a high molecular weight, antioxidant-free polyethylene, said mixture being fused together into a form stable article.

3. An article according to claim 2 in which said polyethylene has a molecular weight of at least one and one-half million.

4. An article according to claim 2 in which said dielectric material is irradiated subsequent to its formation.

5. A strip transmission line comprising a pair of substantially parallel conductive members held in spaced relationship to each other by a low loss dielectric material, said low loss dielectric material consisting essentially of a fused mixture of a high molecular weight, antioxidant free polyethylene and cross linked polystyrene.

6. A strip transmission line in accordance with claim 5 in which said conductive members are comprised of copper.

References Cited by the Examiner

UNITED STATES PATENTS

| | | | |
|---|---|---|---|
| 2,282,002 | 5/1942 | Scott | 260—45.4 X |
| 2,888,424 | 5/1959 | Precopio et al. | |
| 2,919,473 | 1/1960 | Cole. | |
| 3,070,557 | 12/1962 | Gessler et al. | 260—45.5 X |
| 3,117,945 | 1/1964 | Gorham | 26—45.4 |

LEWIS H. MYERS, *Primary Examiner.*

DARRELL L. CLAY, LARAMIE E. ASKIN, *Examiners.*